(12) United States Patent
Hill et al.

(10) Patent No.: US 7,721,820 B2
(45) Date of Patent: May 25, 2010

(54) BUFFER FOR EXPLOSIVE DEVICE

(75) Inventors: Freeman L. Hill, Houston, TX (US); Randy L. Evans, Sugar Land, TX (US)

(73) Assignee: Baker Hughes Incorporated, Houston, TX (US)

( * ) Notice: Subject to any disclaimer, the term of this patent is extended or adjusted under 35 U.S.C. 154(b) by 127 days.

(21) Appl. No.: 12/044,739

(22) Filed: Mar. 7, 2008

(65) Prior Publication Data
US 2009/0223714 A1   Sep. 10, 2009

(51) Int. Cl.
  *E21B 43/11*   (2006.01)
  *E21B 43/116*  (2006.01)
  *E21B 29/02*   (2006.01)
  *F42D 5/00*    (2006.01)

(52) U.S. Cl. .................... 175/4.54; 175/4.52; 175/4.53; 166/55; 166/63; 166/286; 102/313; 102/319

(58) Field of Classification Search .................... 166/55, 166/63, 259, 286; 175/4.52, 4.53, 321, 4.54; 102/307, 313, 319
See application file for complete search history.

(56) References Cited

U.S. PATENT DOCUMENTS

| | | |
|---|---|---|
| 5,131,470 A | 7/1992 | Miszewski et al. |
| 6,412,614 B1 | 7/2002 | Lagrange et al. |
| 7,044,219 B2 | 5/2006 | Mason et al. |
| 7,121,340 B2 | 10/2006 | Grove et al. |
| 2003/0089497 A1* | 5/2003 | George et al. ............... 166/297 |
| 2004/0168805 A1 | 9/2004 | Fripp et al. |

* cited by examiner

*Primary Examiner*—Jennifer H Gay
*Assistant Examiner*—Michael Wills, III
(74) *Attorney, Agent, or Firm*—Bracewell & Giuliani LLP

(57) ABSTRACT

A buffering device for use in conjunction with a downhole tool string, wherein the tool string includes a ballistics device. The buffering device includes a mandrel attached within a tool string and proximate to the ballistics device. An anchor is disposed on the mandrel and a disk plate is coaxially placed on the mandrel that is slideable thereon. The disk plate is proximate to the ballistic device. A resilient member, such as a spring, is coaxially placed on the mandrel between the disk plate and the anchor. The pressure wave produced by activation of the ballistic device pushes the disk plate toward the anchor and compresses the spring there between. Since the disk plate extends outward into sealing contact with casing lining the wellbore, compression of the spring dissipates energy waves produced by activation of the ballistic device.

18 Claims, 2 Drawing Sheets

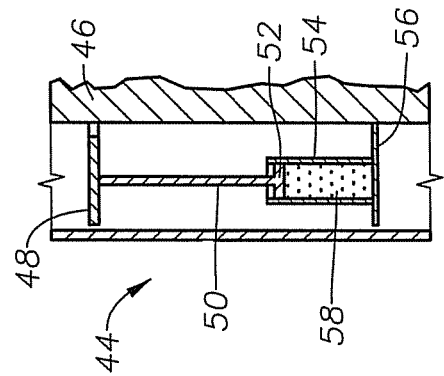
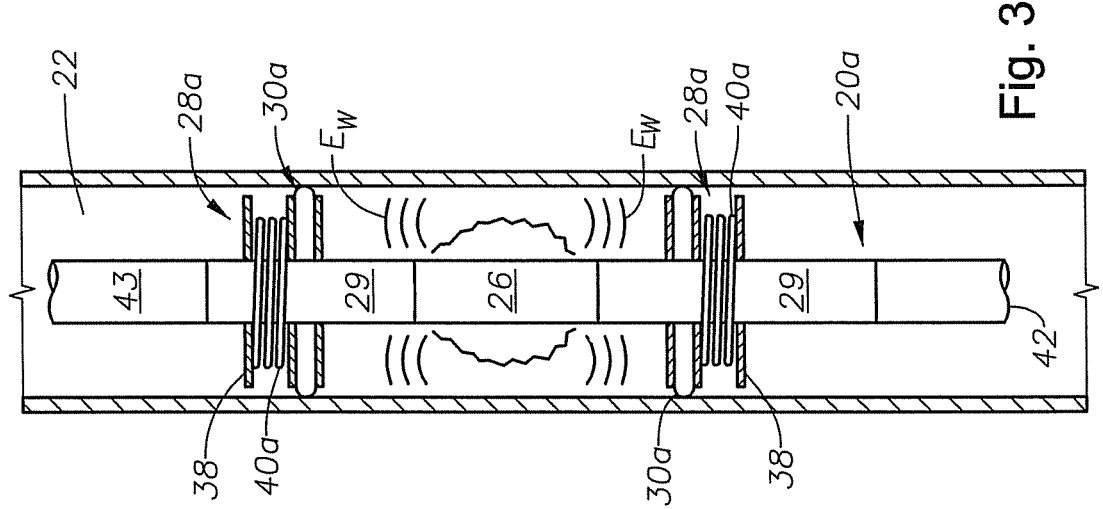
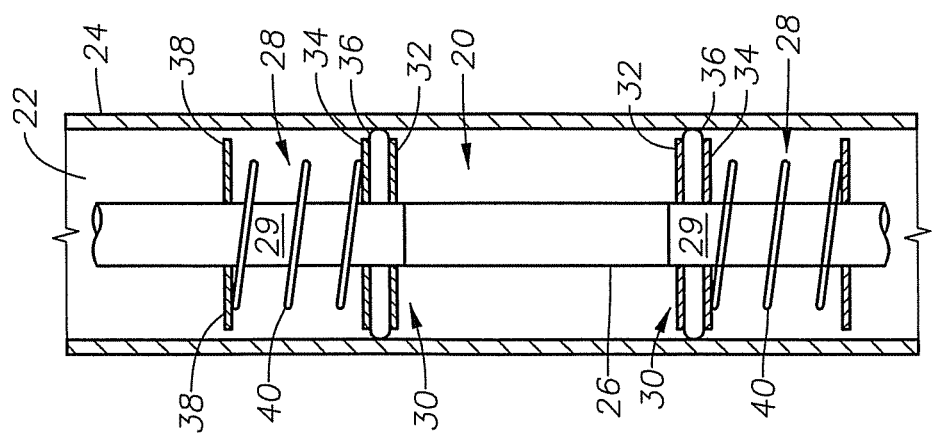

BUFFER FOR EXPLOSIVE DEVICE

BACKGROUND

1. Field of Invention

The invention relates generally to the field of oil and gas production. More specifically, the present invention relates to a system for buffering explosions produced during wellbore operations.

2. Description of Prior Art

Various operations are conducted in a hydrocarbon producing wellbore that generate an explosion and/or percussive pressure wave in the wellbore. Such operations include wellbore perforating, a back-off shot, roll shot, dry pipe shot, and cutting devices. Downhole cutting devices typically sever a tubular member where the portion of the member above the cut is removed. Perforating systems are used for the purpose, among others, of making hydraulic communication passages, called perforations, in wellbores drilled through earth formations so that predetermined zones of the earth formations can be hydraulically connected to the wellbore. Perforations are needed because wellbores are typically completed by coaxially inserting a pipe or casing into the wellbore. The casing is retained in the wellbore by pumping cement into the annular space between the wellbore and the casing. The cemented casing is provided in the wellbore for the specific purpose of hydraulically isolating from each other the various earth formations penetrated by the wellbore.

One typical example of a perforating system 4 is shown in FIG. 1. As shown, the perforating system 4 comprises one or more perforating guns 6 strung together to form a perforating gun string 3, these strings of guns can sometimes surpass a thousand feet of perforating length. Connector subs 18 provide connectivity between each adjacent gun 6 of the string 3. Many gun systems, especially those comprised of long strings of individual guns, are conveyed via tubing 5. Others may be deployed suspended on wireline or slickline (not shown).

Included with the perforating gun 6 are shaped charges 8 that typically include a housing, a liner, and a quantity of high explosive inserted between the liner and the housing. A controller or operator (not shown) at surface 9 sends a signal via the wireline 5 to initiate perforation detonation. When the high explosive is detonated, quickly expanding explosive gases are formed whose force collapses the liner and ejects it from one end of the charge 8 away from the gun body 14 at very high velocity in a pattern called a "jet" 12. The jet 12 perforates the casing and the cement and creates a perforation 10 that extends into the surrounding formation 2. The resulting perforation 10 provides fluid communication between the formation 2 and the inside of the wellbore 1. In an underbalanced situation (where the formation pressure exceeds the wellbore pressure) formation fluids flow from the formation 2 into the wellbore 1, thereby increasing the pressure of the wellbore 1.

Ballistic detonation within a wellbore 1 creates a pressure wave $P_W$ that travels through the wellbore 1. The ensuing shock and vibration of the pressure wave $P_W$ is sufficiently large damage to damage other downhole tools in the wellbore 1 or proximate to the ballistics device. In some instances, the pressure wave $P_W$ can push the ballistics device itself suddenly up or down within the wellbore.

SUMMARY OF INVENTION

Disclosed herein is a wellbore tool string that includes a ballistics device, a downhole tool, and a first buffering device disposed between the ballistics device and the downhole tool. The buffering device includes a mandrel coaxial with the tool string, an anchor attached to the mandrel, a disk assembly disposed on the mandrel between the anchor and the ballistics device. The disk assembly is coaxially slidable on the mandrel. A resilient device is disposed between the anchor and the disk assembly. The resilient device may be a spring, multiple springs substantially parallel with the mandrel, or a fluid filled cylinder. The disk assembly may include a seal radially extending from the disk assembly into sealing contact with the wellbore inner diameter. A second buffering device may be included with the tool string that is substantially the same as the first buffering device and disposed proximate to the end of the ballistics device opposite the first buffering device. A second downhole tool may be included, wherein the second buffering device is disposed between the ballistics device and the second downhole tool. The ballistics device can be a perforating gun, downhole explosive cutter, string shot, back-off shot, or other pipe recovery ballistic tool. The downhole tool can be a ballistics device or another tool.

Also disclosed herein is a buffer assembly for use with a downhole ballistic device. The buffer assembly includes a mandrel, an anchor affixed to the housing, a disk assembly slideable on the mandrel and moveable towards the anchor in response to an energy wave produced by activation of the ballistic device. The buffer assembly includes a resilient member disposed between the anchor and the disk assembly, the resilient member formed to store energy therein. A seal may optionally be provided on the disk assembly outer periphery, wherein the buffer assembly is configured for disposal in a wellbore, the seal outer circumference extending into sealing contact with the wellbore inner diameter. A ballistics device is optionally attachable to the buffer assembly. A second buffer assembly is available for attachment to the ballistics device second end. A downhole tool may be attached to the buffer assembly on an end opposite the ballistics device.

The present disclosure includes a method of using a tool string within a wellbore comprising providing a tool string in a wellbore having a downhole tool, a ballistics device, and a buffering device between the downhole tool and the ballistics device, wherein the buffering device comprises a mandrel substantially coaxial with the tool string, an anchor on the mandrel, a disk assembly between the anchor and the ballistics device, and a resilient member between the disk assembly and the anchor. The method further includes activating the ballistics device thereby producing an energy wave in the wellbore that urges the disk assembly into the resilient member and stores energy from the energy wave in the resilient member thereby dissipating the energy wave prior to it reaching the downhole tool.

BRIEF DESCRIPTION OF DRAWINGS

Some of the features and benefits of the present invention having been stated, others will become apparent as the description proceeds when taken in conjunction with the accompanying drawings, in which:

FIG. 2 illustrates a partial cutaway side view of an example of a tool string having a downhole ballistics buffer.

FIG. 3 is a side partial cutaway view of an example of a tool string with a ballistics buffer in use.

FIG. 4 is a side partial cutaway view of an energy absorbing apparatus for use in a ballistics buffer.

Figure 1:
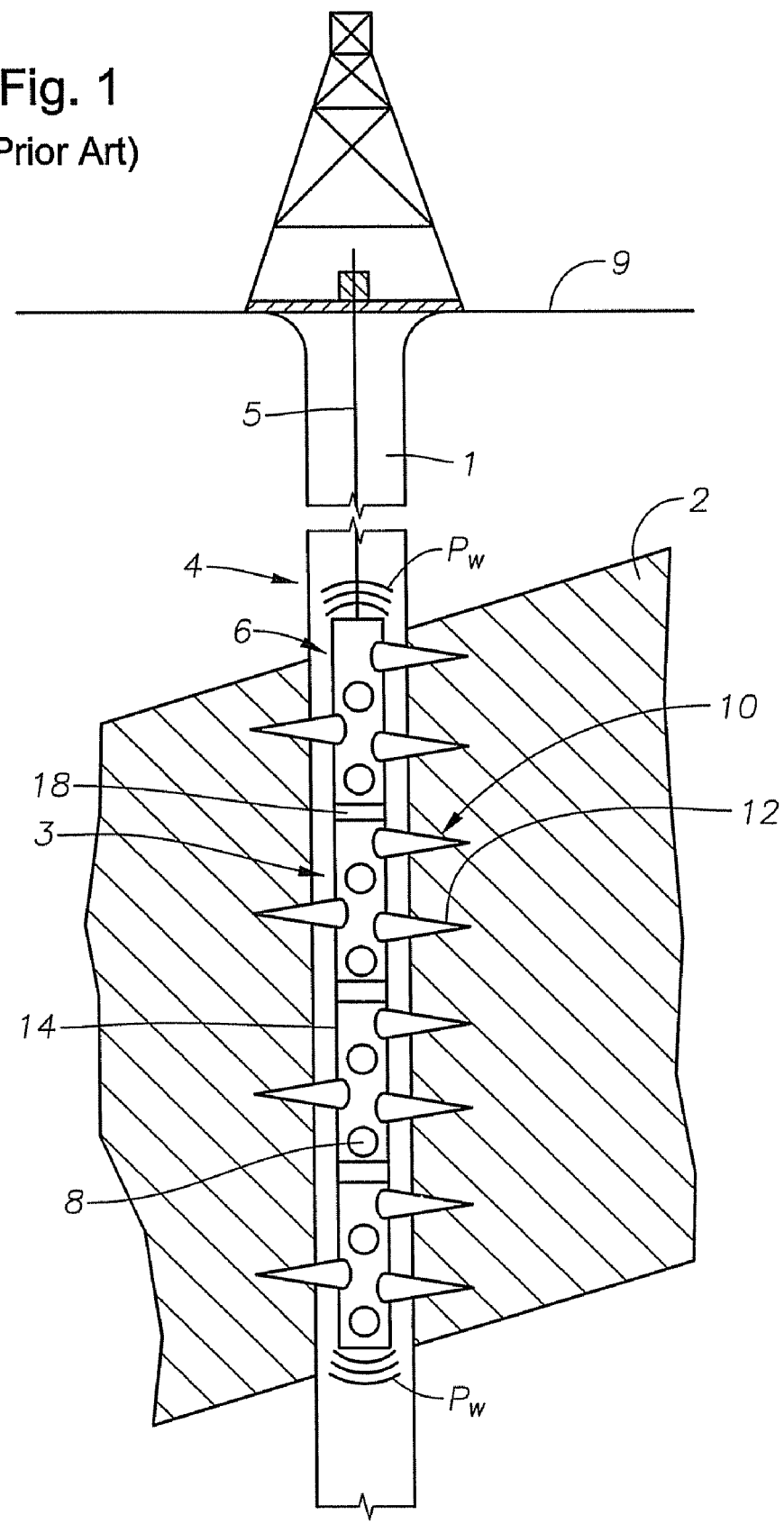
FIG. 1 is partial cutaway side view of a prior art perforating system in a wellbore.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The present invention will now be described more fully hereinafter with reference to the accompanying drawings in which embodiments of the invention are shown. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout. For the convenience in referring to the accompanying figures, directional terms are used for reference and illustration only. For example, the directional terms such as "upper", "lower", "above", "below", and the like are being used to illustrate a relational location.

It is to be understood that the invention is not limited to the exact details of construction, operation, exact materials, or embodiments shown and described, as modifications and equivalents will be apparent to one skilled in the art. In the drawings and specification, there have been disclosed illustrative embodiments of the invention and, although specific terms are employed, they are used in a generic and descriptive sense only and not for the purpose of limitation. Accordingly, the invention is therefore to be limited only by the scope of the appended claims.

Disclosed herein is an energy absorbing buffer system used in damping and absorbing energy waves produced by a downhole ballistics device. The buffering device disclosed herein is part of a tool string connected with the ballistics device and other downhole devices. The buffering device is positionable in the annular region between the tool string and the inner circumference of the wellbore in which the tool string is inserted. The buffering device compresses in response to a ballistics detonation pressure energy wave detonation and dissipates and disrupts the pressure wave by being compressed in response to exposure to the pressure wave. The pressure wave is thus dissipated and/or disrupted by the buffering device and will have little or no effect on other downhole devices coupled with the tool string.

FIG. 2 is a partial cross-sectional side view of an embodiment of a portion of a tool string 20 disposed within a wellbore 22. In this embodiment, the tool string 20 is a generally elongated member comprising a ballistic device 26 with a buffer device 28 on both of its respective ends. The ballistic device 26 may be any tool used in a wellbore that produces an energy wave in the wellbore 22. Examples of a ballistic device 26 include a perforating gun, downhole explosive cutter, string shot, back-off shot, or other pipe recovery ballistic tool.

In the embodiment of FIG. 2, the buffer device 28 comprises an elongate and cylindrical mandrel 29 that is substantially coaxially aligned with the remaining portion of the tool string 20. Affixed to the mandrel 29 is an anchor plate 38 that extends generally perpendicularly away from the mandrel 29. Although shown as a generally disk like member, the anchor plate 38 may also comprise bars on the mandrel 29. The buffer device 28 further comprises a disk assembly 30 disposed on the mandrel 29 between the ballistic device 26 and the anchor plate 38. As will be discussed in more detail below, the disk assembly 30 is coaxially slideable over a portion of the mandrel 29. A resilient member, shown in FIG. 2 as a spring 28, is positioned around the mandrel 29 between the disk assembly 30 and the anchor plate 38.

The embodiment of the disk assembly 30 shown in FIG. 2 comprises an annular disk shaped pressure plate 32 having an opening through its center axis for receiving the mandrel 29 therein and for freely sliding over the mandrel. The disk assembly 30 further comprises a spring plate 34 substantially parallel with the pressure plate and disposed between the pressure plate and the anchor 38. A seal member 36 is connectively disposed between the pressure plate 32 and the spring plate 34. The seal member 36 is preferably formed from a generally pliable material and has an outer radial peripheral surface extending away from the tool body into sealing contact as shown with the inner circumference of the casing 24 lining the wellbore 22. The spring plate 34, as described in more detail below, is urgeable into compressive engagement with the spring 40. Accordingly, in the present disclosure, the spring plate 34 is also referred to herein as a compression plate. The disk assembly 30 is not limited to the embodiment of FIG. 2, but includes other devices responsive to pressure waves and aid in the dissipation or buffering of pressure waves. Moreover, the disk assembly 30 can take on other shapes, such as toroidal, cylindrical, and parabolic, to name but a few.

One example of operation of a tool string 20a experiencing a ballistics event is provided in a side and partial cross-sectional view in FIG. 3. In this embodiment, the ballistic event is caused by activating the ballistic device 26, either through real time surface control or through a pre-programmed controller (not shown) integral with the tool string 20a. The ballistic event produces energy waves $E_W$ that travel through the wellbore 22 away from the ballistic device 26. For the purposes of discussion herein, the term energy wave $E_W$ includes compressional pressure waves, shock waves, vibration, and any other mechanical force generated by initiation of the ballistic device 26.

The energy waves $E_W$ are shown axially propagating through the wellbore 22 and ultimately reaching the respective disk assemblies 28a disposed on the upper and lower ends of the ballistic device 26. The disk assemblies 30a are responsive to the energy wave $E_W$ and slide along their respective mandrels 29 away from the ballistic device 26. The responsive sliding action of the disk assemblies 30a urges the disk assemblies 30a toward their respective anchors 38 thereby compressing the springs 40a there between. By sliding the disk assemblies 30a along the mandrel 29 and compressing the springs 40a, the energy waves $E_W$ are dissipated within the buffer devices 28a. Also provided as part of the tool string 20a of FIG. 3 are downhole tools (42, 43), wherein the buffer devices 28a are disposed between the ballistic device 26 and the downhole tools (42, 43). Accordingly, positioning the buffer devices 28a between the ballistic device 26 and the tools (42, 43) dissipates the propagating energy waves $E_W$ thereby buffering and isolating the downhole tools (42, 43) from the potentially damaging shock and vibration from the ballistic device 26. The downhole tools (42, 43) may be another ballistic device or may be a downhole tool used in exploration, development, monitoring, diagnostics, or remediation of the well or reservoir. Examples of tools used include a freepoint tool, pipe recovery log, casing inspection, pressure gauges, production logging tools, or other diagnostic and monitoring services.

A side view of an alternative embodiment of a buffer device 44 is shown in FIG. 4. In this embodiment, a pressure plate 48, which is an annular disk-like member circumscribes a portion of a mandrel 46. A rod 50 extends from a compressive end of the pressure plate with a piston 52 on its distal end. The piston 52 is disposed within a cylinder 54 which is sealed and contains a fluid 58. The fluid may be a compressed gas such as air or nitrogen or a liquid such as an oil. The cylinder 54 is supported on its lower end by an anchor plate 56 which is affixed to the outer surface of the mandrel 46. Optionally, a spring may be inserted within the cylinder in lieu of the compressible fluid 58. Preferably, the buffer device 44 of FIG. 4 would include multiple cylinder and piston arrangements disposed radially about the outer or inner circumference of the mandrel 46.

Accordingly, many advantages may be realized by employing the buffering device as disclosed herein. Disposing a buffering device in the annular region on the outer surface of a tool string, provides for dissipating damaging shock and vibrational waves through this annular region thereby isolating other tools within the same tool string from the effects of the ballistic event of a ballistic device. Moreover, isolating a shock wave or energy wave in the region proximate to a ballistic device can prevent the sudden and violent propelling of the entire tool string upward or downward within the wellbore.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A wellbore tool string comprising:
   a ballistics device;
   a downhole tool; and
   a first buffering device disposed between the ballistics device and the downhole tool, the buffering device comprising a mandrel coaxial with the tool string, an anchor attached to the mandrel, a disk assembly slidably disposed on the mandrel between the anchor and the ballistics device, a seal radially extending from the disk assembly, so that when the tool string is placed in a wellbore, the seal is in sealing contact with an inner surface of the wellbore, and a resilient device between the anchor and the disk assembly.

2. The tool string of claim 1, wherein the resilient device is selected from the list consisting of a spring and a fluid filled cylinder.

3. The tool string of claim 2, wherein the spring circumscribes the mandrel.

4. The tool string of claim 1, wherein the resilient device comprises multiple springs substantially parallel with the mandrel.

5. The tool string of claim 1 further comprising a second buffering device substantially the same as the first buffering device and disposed proximate to the end of the ballistics device opposite the first buffering device.

6. The tool string of claim 5 further comprising a second downhole tool, wherein the second buffering device is disposed between the ballistics device and the second downhole tool.

7. The tool string of claim 1, wherein the ballistics device is selected from the list consisting of a perforating gun, downhole explosive cutter, string shot, back-off shot, and other pipe recovery ballistic tool.

8. The tool string of claim 1, wherein the disk assembly is responsive to a ballistic event from the ballistics device and urgeable against the resilient member thereby storing energy in the resilient member.

9. The tool string of claim 1 wherein the downhole tool is selected from the list consisting of a ballistics device, a freepoint tool, pipe recovery log, casing inspection, pressure gauges, production logging tools, or other diagnostic and monitoring services.

10. A buffer assembly for use with a downhole ballistic device comprising:
    a mandrel;
    an anchor affixed to the housing;
    a disk assembly slideable on the mandrel and moveable towards the anchor in response to an energy wave produced by activation of the ballistic device;
    a seal radially extending from the disk assembly, so that when the mandrel is placed in a wellbore, the seal is in sealing contact with an inner surface of the wellbore,
    a resilient member disposed between the anchor and the disk assembly, the resilient member formed to store and/or disrupt energy therein.

11. The buffer assembly of claim 10, further comprising an attached ballistics device having a first end and a second end, and attached to the buffer assembly on its first end.

12. The buffer assembly of claim 11, wherein the disk assembly comprises a compression plate in engaging contact with the resilient member, a pressure plate between the compression plate and the ballistics device, and a seal between the compression plate and the pressure plate.

13. The buffer assembly of claim 10, wherein the resilient member is selected from the list consisting of a spring member and a piston housed in a cylinder with fluid.

14. The buffer assembly of claim 11, further comprising a second buffer assembly attached to the ballistics device second end.

15. The buffer assembly of claim 11 further comprising a downhole tool attached to the buffer assembly on an end opposite the ballistics device.

16. A method of perforating within a wellbore comprising:
    providing a ballistics device in a wellbore, having;
    a disk slideable with respect to the ballistics device with a pressure seal that radially extends outward from the disk on opposing ends of the ballistics device; and
    activating the ballistics device thereby producing an energy wave in the wellbore, so that when the energy wave contacts the pressure seal, the pressure seal resiliently contracts and stores energy from the energy wave in the resilient pressure seal threrby dissipating the energy wave.

17. The method of claim 16, wherein the pressure seal comprises a disk assembly, a seal radially extending outward from the disk assembly, and a resilient member coaxial with the disk assembly.

18. The method of claim 17, further comprising disposing a downhole tool in the wellbore that is selected from the list consisting of a ballistics device, a freepoint tool, pipe recovery log, casing inspection, pressure gauges, production logging tools, or other diagnostic and monitoring services.

* * * * *